United States Patent [19]

McKown

[11] Patent Number: 5,089,137
[45] Date of Patent: Feb. 18, 1992

[54] GAS-LIQUID CONTACT SHEET AND PACKING MATERIAL

[76] Inventor: Gerard V. McKown, 977 Broad Run Rd., West Chester, Pa. 19380

[21] Appl. No.: 592,797

[22] Filed: Oct. 4, 1990

[51] Int. Cl.⁵ ............................ C02F 3/10; B01F 3/04
[52] U.S. Cl. .................................... 210/615; 210/150; 261/112.2; 261/DIG. 72
[58] Field of Search .................. 210/615, 150, 151; 261/112.2, DIG. 72

[56] References Cited

U.S. PATENT DOCUMENTS

| | | | |
|---|---|---|---|
| 3,830,684 | 8/1974 | Hamon | 261/112.2 |
| 3,887,664 | 6/1975 | Regehr | 261/112.2 |
| 4,634,534 | 1/1987 | Cominetta et al. | 210/150 |
| 4,666,593 | 5/1987 | Bosne | 210/150 |
| 4,800,047 | 1/1989 | Monjoie | 261/112.2 |
| 4,905,313 | 2/1990 | Stackhouse | 261/112.2 |

Primary Examiner—Thomas Wyse
Attorney, Agent, or Firm—Ratner & Prestia

[57] ABSTRACT

The present invention comprises a trickle filter media which maximizes wastewater contact with both sides of the media sheet. The media comprises a corrugated sheet, where the corrugations run vertically. Within the valley of each corrugation is a protuberance which effectively blocks off the cross-sectional area of the valley, to falling liquid. The protuberance is rounded such that once the liquid contacts the sheet, surface tension will cause it to remain in contact with the sheet until it reaches the bottom end of the sheet. The protuberance is extended from each side of the sheet to block off alternating valleys on opposite sides of the corrugated sheet. For structural stability, these protuberances are staggered vertically along the sheet and include reinforcing ribs.

9 Claims, 3 Drawing Sheets

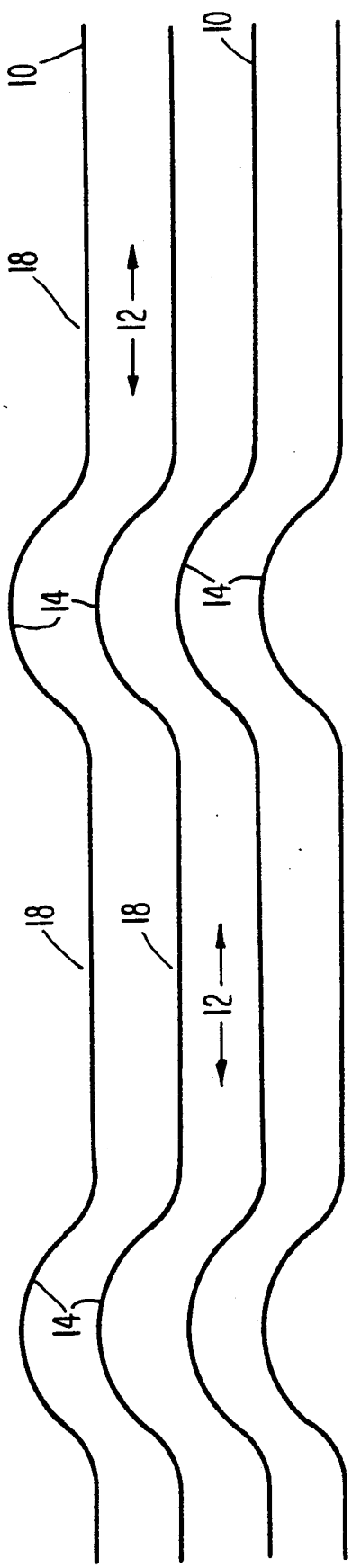
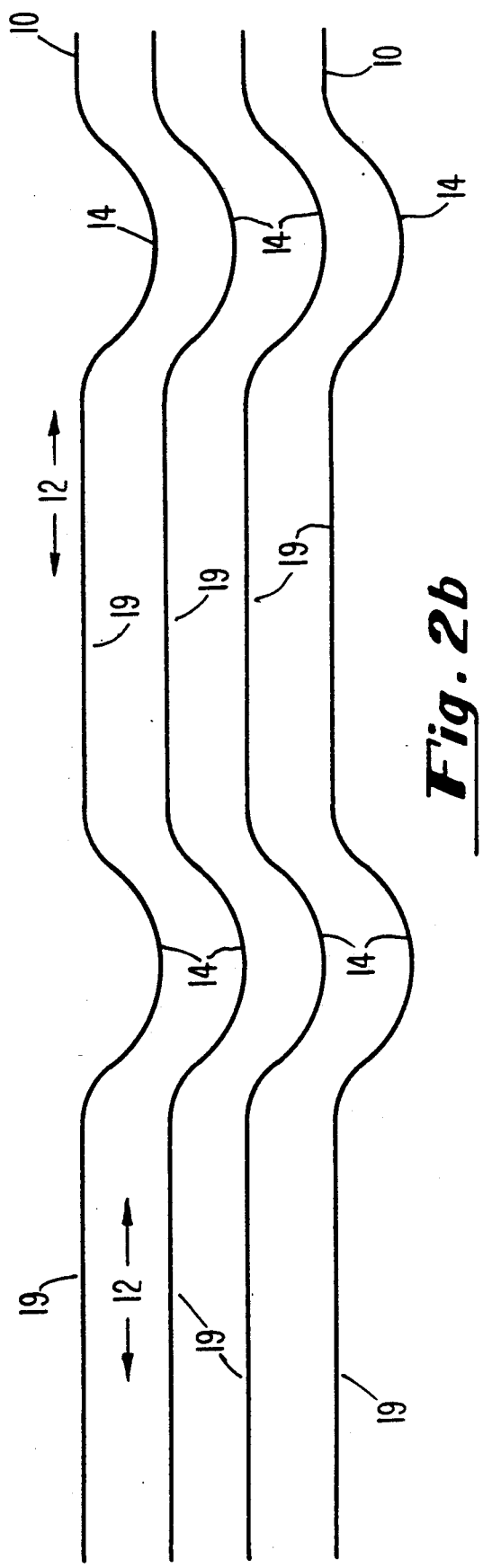
Fig. 2a
Fig. 2b

GAS-LIQUID CONTACT SHEET AND PACKING MATERIAL

BACKGROUND OF THE INVENTION

1. Field of the Invention

The present invention relates to a method and apparatus comprising an improved gas-liquid contact media. This invention has particular utility in the treatment of wastewater by biological oxidation.

2. Background and Description of the Related Art

The biological oxidation of organic pollutants in wastewater by passage over a gas-liquid contact media is a well established method of sewage treatment. The wastewater is applied to the media and allowed to uniformly disperse over the media surface. Bacteria which are present in the wastewater are encouraged to cling to and propagate upon the media surface when an adequate amount of oxygen is brought into direct contact with the bacteria. This oxygen is most often supplied in the form of air.

Most treatment surfaces are constructed so as to have vertical planar surfaces. This arrangement allows the wastewater to flow downward over the media surface by gravity in a falling film. Air, the oxygen-containing gas, is either flowing countercurrently to the falling film or concurrently, depending on the design of the treatment facility.

These biological oxidation gas-liquid contact media surfaces are commonly referred to as trickling filters by those skilled in the art. Initial trickling filter designs employed coarse rocks as bulk surface area. These rock trickling filters have numerous disadvantages as will become apparent later in this document. Presently, most trickling filters are molded from plastic sheet material. Plastic media provides large amounts of surface area thus enabling greater treatment area per unit of volume. Hence, treatment facilities of a given capacity can utilize a much smaller portion of the facility dedicated solely to trickling filters. This is important as the trickling filter is only one portion of complete sewage treatment.

Prior trickling filters have numerous shortcomings. Generally, all previous trickling filters constructed from plastic materials consisted of a flat sheet of plastic attached to another formed sheet of a folded or raised surface shape. These sheets are attached together by glue or other attachment methods to form a three-dimensional unit with hollow channels extending lengthwise or diagonal to the media unit.

Treatment media constructed with diagonal channels have the distinct disadvantage that the wastewater will not contact the undersides of the diagonal channels in this media design. This results in a substantial loss of total treatment surface that has no contact with the wastewater. This lack of underside wetting action is also experienced with traditional rock trickling filters. Further, rock filters restrict flow and tend to become clogged with biomass if used over extended time periods.

Additional disadvantages of existing media configurations are geometric designs that utilize open vertical channels that are unobstructed throughout their vertical axis. This allows wastewater to enter at the top of the channel as it drips off the sheet above and avoid any contact with the surface of the media thus precluding the treatment action of the bacteria residing on the media surface (biomass). The untreated wastewater is thus discharged with a portion of wastewater that has made contact with the treatment surface and dilutes the performance of the treatment process as a whole.

OBJECTS OF THE INVENTION

The primary objective of the present invention is to eliminate the drawbacks of the disclosed configurations of biological oxidation gas-liquid contact media, as explained above. Furthermore, this present invention provides a media with enhanced treatment performance per unit of volume.

It is an object of this invention to maximize the treatment surface available while retaining clog-resistant passages for wastewater flow.

It is an object of this invention to maximize the surface wetting action of the media by the falling film of wastewater.

It is an object of this invention to prevent the flow of wastewater from free falling completely through the media without contacting the biomass adhering to the media surface.

It is an object of this invention to enhance the air-wastewater biomass contact to promote the most efficient life cycle of the biomass, i.e. elimination of uncontrolled growth due to poor flushing action of the falling film.

It is an object of this invention to minimize the occluded areas formed when sheets comprising the media are jointed together, since the presence of occluded areas promotes excess biomass growth that diminishes media performance and such excess growth is difficult to remove regardless of flushing intensity.

It is an object of this invention to contract media units from one common sheet configuration.

These objects are fulfilled in accordance with the following description of configuration and operation, and description of preferred embodiments and illustrations.

SUMMARY OF THE INVENTION

The present invention is a trickle filter media comprised of a multiplicity of individual formed sheets. Each sheet is corrugated and consequently includes a series of parallel linear valleys on alternate sides of each sheet. Each valley includes at least one protuberance which effectively blocks the cross-sectional area of the valley. Each protuberance is rounded such that once the liquid contacts the sheet, surface tension will cause it to remain in contact with the sheet until it reaches the bottom end of the sheet. Further, each protuberance intersects one valley at two locations. These intersections are smooth in order to provide a continuous fluid flow surface between the protuberance and the valley. Since the valleys occur on opposite sides of the corrugated sheet, the protuberances also extend on opposite sides of the corrugated sheet. For structural stability, these protuberances are staggered vertically along the sheet and include reinforcing ribs.

BRIEF DESCRIPTION OF THE FIGURES

FIG. 2a is a cross-sectional view, taken along the line 2a—2a of FIG. 1, of several sheets of the trickle filter media of the present invention, stacked and secured together.

FIG. 2b is a cross-sectional view, taken along the line 2b—2b of FIG. 1, of several sheets of the trickle filter media of the present invention, stacked and secured together.

DESCRIPTION OF THE PREFERRED EMBODIMENT

The present invention comprises a trickle filter media designed to facilitate contact and maximize the area of contact of wastewater with biomass and oxygen (in the form of air) necessary the treat the wastewater.

Figure 1:
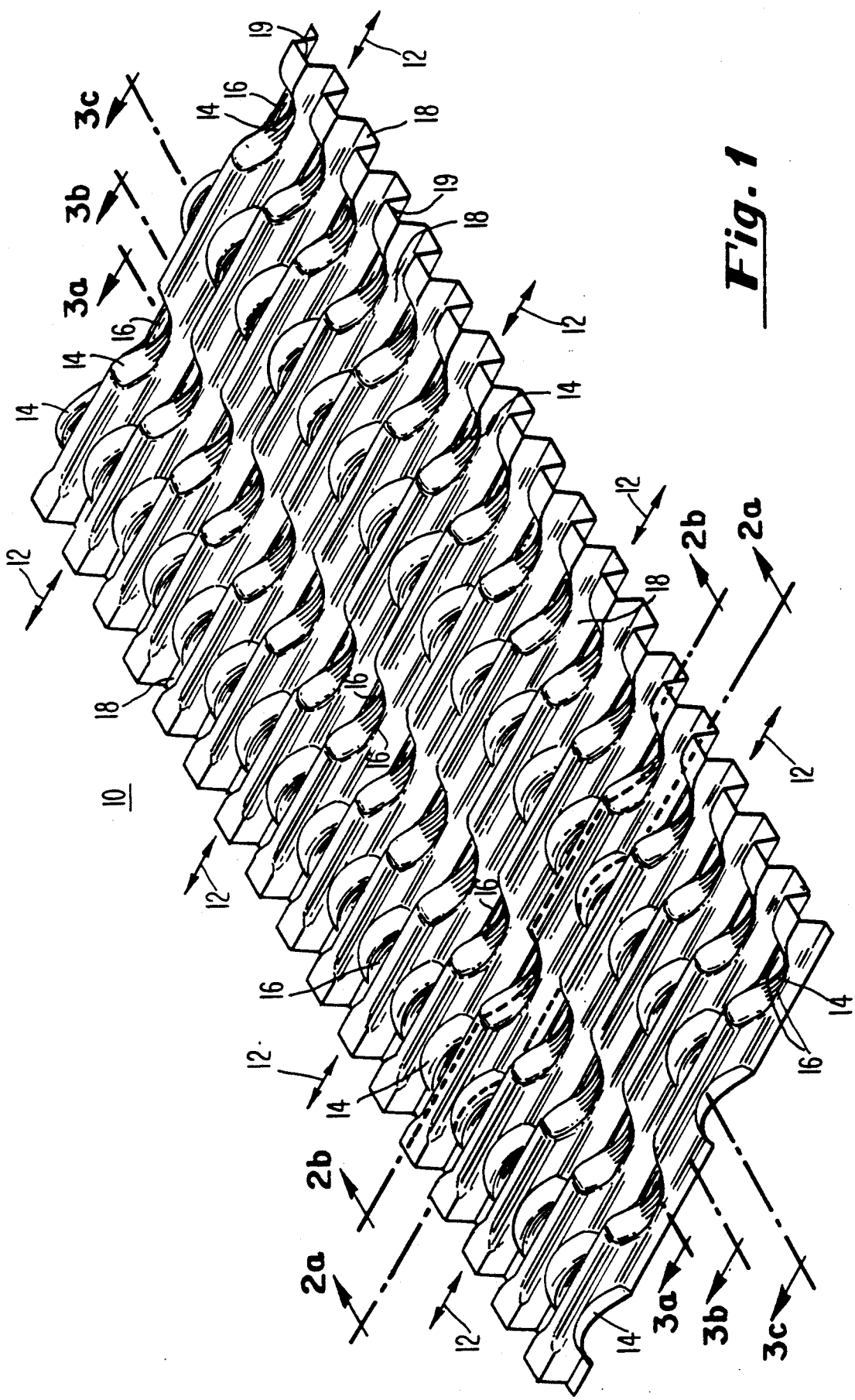
FIG. 1 is a perspective view of one sheet of the trickle filter media of the present invention.

FIG. 1 shows one sheet of the trickle filter media of the present invention. In operation, a plurality of individual sheets are bonded together for use, as will be explained presently. For clarity, only one such sheet is shown here.

The trickle filter media sheet 10 can be described as roughly corrugated, as may be seen in FIG. 1. The corrugations create a series of longitudinal peaks and valleys 18 on each face of sheet 10. The peaks on one face of the sheet correspond to valleys 19 on the opposite face of the sheet. In FIG. 1, the valleys on the upper (in the figure) side of sheet 10 have been numbered 18, while the valleys on the underside have been numbered 19. Sheet 10 is symmetrical about a point in the center of the sheet. Accordingly, the sheet looks the same regardless of which face is examined. Therefore, the sheet will be described with reference to the valleys of the sheet, with the understanding that the described features also exist in the valleys on the opposite face of the sheet.

In use, wastewater flow over the sheet is in the direction shown by arrows 12. Since sheet 10 is symmetrical, the flow may be in either direction, depending upon the orientation of sheet 10 and the block of which it forms a part. That is, since the sheets, and, thus, the blocks, are symmetrical, the blocks may be positioned so that either of the two long sides of sheet 10 is on top (and the other long side is on the bottom). Thus, the flow may be in either of two directions, indicated by arrows 12. FIGS. 2a and 2b show a cross sections of a block or stack comprising several sheets. The cross sections of FIGS. 2a and 2b are taken across each sheet 10 in the block or stack along the lines 2a—2a and 2b—2b respectively in FIG. 1. FIG. 2a is taken through a valley 18. FIG. 2b is taken through a valley In use, wastewater flows vertically in the direction shown by arrows 12. Since each sheet 10 comprises valleys alternating from one face to the other, wastewater will contact either a section of block similar to FIG. 2a or a section similar to 2b. Looking at FIG. 2a, if wastewater drips off a block above and encounters a section of block similar to that shown by FIG. 2a, the wastewater must encounter a protuberance 14.

Wastewater clings to sheet 10 upon contacting protuberance 14. Each protuberance 14 meets its corresponding valley 18 at two locations, that is at the two ends of the protuberance. Where protuberance 14 meets valley 18, the sheet is contoured to produce a smooth curve instead of a sharp angle. This allows the wastewater which contacts sheet 10 at protuberance 14 to continue to cling to sheet 10 along valley 18. If the transition between protuberance 14 and valley 18 were not smooth, the wastewater would fall off sheet 10. This should be avoided since, as previously mentioned, the wastewater is treated only while it is in contact with sheet 10, where the biomass resides. FIGS. 2a and 2b each show two protuberances 14 per valley 18 or 19 in sheet 10. This is not necessary for the proper operation of the invention. Since it is only necessary that the wastewater be prevented from falling completely through the media without contacting a sheet 10, only one protuberance per valley 18 or 19 is necessary. In this way, every valley is closed off with a protuberance, which is all that is required to prevent the free passage of falling wastewater.

If the wastewater drips off a block above and encounters a section of block similar to that shown by FIG. 2b, it will encounter a different protuberance 14 which projects from the opposite face of sheet 10 from those protuberances shown in FIG. 2a. Again, the wastewater will cling to sheet 10 and flow down and over valleys 19. Thus portions of the wastewater will encounter each face of sheet 10. Since both faces of sheet 10 are utilized, the total surface area covered with wastewater and biomass is approximately the same as the total surface area of the trickle filter media, but the surface area wetted with wastewater is twice the wetted area of trickle filter media which is wetted on only one face. Therefore, the amount of media needed may be greatly reduced, or the system may be designed for greatly enhanced capacity.

Figure 3A:
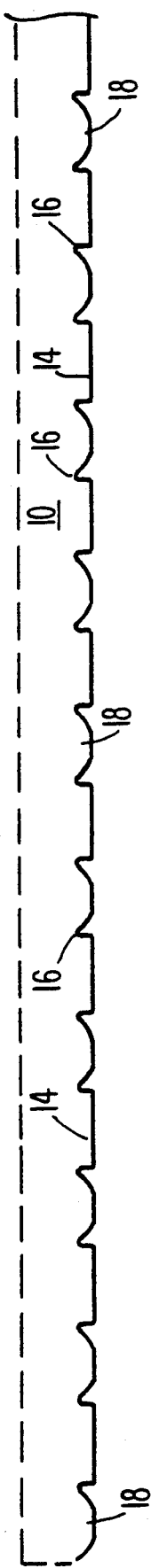
FIG. 3a is a cross-sectional view of one sheet of the trickle filter media of the present invention taken along the line 3a—3a of FIG. 1.
Figure 3B:
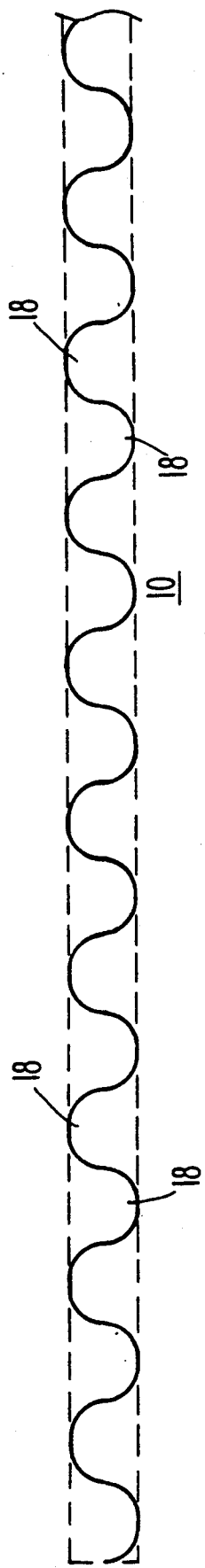
FIG. 3b is a cross-sectional view of one sheet of the trickle filter media of the present invention taken along the line 3b—3b of FIG. 1.
Figure 3C:
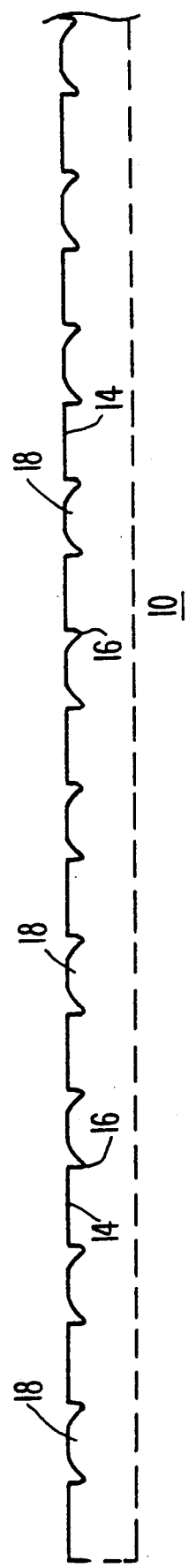
FIG. 3c is a cross-sectional view of one sheet of the trickle filter media of the present invention taken along the line 3c—3c of FIG. 1.

FIGS. 3a, 3b, and 3c show horizontal cross sections of sheet 10. The dotted lines show the area taken up by the sheet by virtue of the corrugations and protuberances, relative to the sheet cross section shown in each figure.

Preferably, individual sheets 10 of media are made by thermoforming flat rigid polyvinyl chloride (PVC) sheets onto a metal mold. Other materials may be used, but PVC is preferred due to its low cost and resistance to degradation. The sheets are heated, formed into the desired shape and cooled. The sheets are then assembled. A number of individual sheets are attached in flat parallel fashion to form a block of trickle filter media. The sheets are attached so that any single valley of any sheet is parallel to all other valleys, whether on the same or a different sheet. These blocks are then used to pack wastewater treatment towers. Such towers can be from three to one hundred fifty feet in diameter and from two to thirty feet in height. The blocks of media are generally produced with a height and width of two feet and a length of two, four, or six feet.

The cost of producing trickle filter media is dependent upon the cost of the raw material used for the media. Thus the amount of PVC used in the media sheets should be minimized. Therefore, the thickness of the starting material PVC sheets used to produce sheets 10 should be minimized. In a large (30 ft.) tower, the sheets at the bottom of the tower must bear the load of all the sheets stacked above it, along with the biomass and wastewater which reside on the sheet. The sheets at the top of the tower need not be as strong as those at the bottom since there is no trickle filter media above them to put stress on the sheets. Therefore, the thickness of the PVC used for the media varies with the position of the block of media in the tower and the size of the tower. To further reinforce the media, and give it rigidity, the media includes stiffening ribs 16, as shown in FIGS. 1, 3a, and 3c. Without these ribs, sheet 10 tends to fold at protuberances 14. Ribs 16 are simply small linear protuberances running parallel to valleys 18, and buttressing the sides of protuberances 14.

When wastewater treatment towers are packed with trickle filter media, the blocks of media are usually arranged so that sheets in one layer are perpendicular to the sheets in adjoining layers. Blocks in one layer support the blocks of media in the next layer. Wastewater is introduced at the top of the column, generally by rotating spray heads. Air is introduced into the column at the bottom and flows countercurrent to the wastewater. The wastewater is passed down the column over the media, where it is acted upon by the biomass and air. Treated wastewater is then withdrawn from the bottom of the column.

In some instances, natural draft air flow may be used to aerate the wastewater treatment column. The use of forced air ventilation instead of natural draft air flow is also common since this type of air flow is more easily controllable and thus insures proper air flow through the column.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed:

1. A trickle filter media comprising:
   a corrugated sheet having a series of parallel vertical linear valleys on alternate sides thereof;
   each of said valleys including at least one protuberance effectively blocking the entire cross-sectional area of said valley;
   each of said protuberances intersecting one of said valleys at two spaced apart locations along the length of said valley and forming a continuous fluid flow surface with said valley.

2. A trickle filter media of claim 1 wherein each of said valleys includes two said protuberances.

3. A trickle filter media of claim 2 wherein said media comprises thermoformed polyvinyl chloride.

4. A trickle filter media of claim 1 further including one pair of reinforcing ribs adjacent and on either side of each said protuberance.

5. A trickle filter media of claim 4 wherein each of said valleys includes two said protuberances and two said pairs of reinforcing ribs.

6. A trickle filter media comprising a plurality of corrugated sheets bonded together, each sheet having a series of parallel vertical linear valleys on alternate sides thereof;
   each of said valleys including at least one protuberance effectively blocking the entire cross-sectional area of said valley;
   each of said protuberances intersecting one of said valleys at two spaced apart locations along the length of said valley and forming a continuous fluid flow surface with said valley.

7. A trickle filter media of claim 6 wherein each said sheet further includes one pair of reinforcing ribs adjacent and on either side of each said protuberance.

8. A trickle filter media of claim 7 wherein each of said valleys includes two said protuberances.

9. A method of treating wastewater comprising:
   filling a column with a media of claim 6;
   allowing said wastewater to flow over said media by introducing said wastewater to the top of said column; and
   ventilating said column by introducing oxygen to the bottom of said column.

* * * * *